3,793,395
Patented Feb. 19, 1974

3,793,395
CATALYTIC HYDROISOMERIZATION OF PARAFFIN HYDROCARBONS IN THE ABSENCE OF MOLECULAR OR GASEOUS OXYGEN

John W. Myers and Reagan T. Wilson, Bartlesville, Okla., assignors to Phillips Petroleum Company
No Drawing. Filed May 3, 1971, Ser. No. 139,893
Int. Cl. C07c 5/24
U.S. Cl. 260—683.68                                  1 Claim

ABSTRACT OF THE DISCLOSURE

An improvement in the isomerization of paraffin hydrocarbons which comprises passing the hydrocarbon feedstream in contact with an isomerization catalyst, the feedstream being substantially free of molecular or gaseous oxygen.

---

This invention relates to the isomerization of paraffin hydrocarbons.

In one of its more specific aspects, this invention relates to an improved catalytic process employing platinum-chloride-alumina catalyst to isomerize paraffin hydrocarbons.

Isomerization of paraffin hydrocarbons employing platinum in combination with chlorine on alumina at temperatures below about 600° F. is well known. A process of this type is that described in U.S. Pat. 3,248,320 to White et al. and embodies contacting a hydrocarbon stream comprising $C_4$ and higher paraffin hydrocarbons with hydrogen and an alumina catalyst containing platinum and chlorine under isomerizing conditions. It is stated therein that it is desirable to provide a feedstock substantially free of sulfur and water when contacting the catalyst, the catalyst having been produced by contacting the alumina, on which the platinum has been deposited, with chlorine carried in a suitable carrier gas such as nitrogen, air or oxygen.

The method of this invention relates to an improvement of that process and comprises providing to the process a feedstream which is substantially free of oxygen. To accomplish this, the feedstream can be treated to remove the oxygen and is maintained in an oxygen-free environment to prevent any substantial oxygen reabsorption after the removal of oxygen from it. Relatedly, an improvement in the process is effected by purging the catalyst bed of molecular and/or gaseous oxygen prior to the introduction of the hydrocarbon feedstream into contact with the catalyst.

In view of the foregoing prior art procedure which, as stated, suggests the chlorination of the platinum-alumina complex by employing a gaseous stream comprising chlorine in a nonreducing gas such as air or oxygen, the beneficial results accruing from the present invention, which manifest themselves in increased catalyst activity, are unexpected.

The hydrocarbon feedstream can be treated to remove the oxygen in a number of ways. For example, it can be fractionated or it can be purged with an inert gas to sweep the oxygen from the liquid hydrocarbon. Also, contact of the feedstream with oxygen-absorbing substances can be used. Thereafter, the substantially oxygen-free feedstream is maintained in a substantially molecular and/or gaseous oxygen-free environment until contacted with the catalyst.

Oxygen can be removed from the catalyst bed in any number of ways. For example, the bed can be swept by a dry inert gas such as nitrogen, carbon dioxide, flue gas and the like and thereafter maintained in a substantially oxygen-free environment until contacted with the feedstream.

The method of this invention is illustrated in the following runs in which a platinum-chloride-alumina catalyst, prepared by activating $\eta$-alumina containing about 0.5 weight percent platinum with a hydrogen stream containing hydrogen chloride at 1200° F. was employed to isomerize n-hexane.

In both runs, isomerization conditions were identical, involving a temperature of 271° F., a pressure of 250 p.s.i.g., a liquid hourly space velocity of 1.0 and a hydrogen to hexane mole ratio of between 2.8 and 3.2, and 300 p.p.m. chloride as carbon tetrachloride in the hexane feed.

The n-hexane feedstream, in the one instance, contained approximately 100 p.p.m. by weight of oxygen. In the second instance, the oxygen had been removed from the feedstream to a concentration of about 1 p.p.m. by weight by purging the stream with nitrogen.

In both instances, conversions were measured at various intervals of catalyst life. Results were as follows:

| Oxygen removal | No | | Yes | |
|---|---|---|---|---|
| Catalyst age, days | 1 | 6 | 1 | 8 |
| n-Hexane conversion, wt. percent | 90 | 54 | 90 | 90 |
| Neohexane in product, wt. percent | 32 | 5 | 31 | 31 |

It will be seen that the method of this invention produces a decided improvement in catalyst life.

The substantial removal of molecular or gaseous oxygen from the feedstream facilitates the maintenance of a higher level of catalyst activity over long process periods.

Additional improvement is realized if molecular or gaseous oxygen is removed from the catalyst to a level of at least 2 p.p.m.

In general, the method of this invention reduces the oxygen content of the feedstream to a value of between about 1 and about 2 p.p.m. by weight although any reduction from that molecular or gaseous oxygen content contained in the original feedstream can be expected to result in an improvement in conversion.

Similarly, the method of this invention reduces the molecular or gaseous oxygen content of the catalyst to a value of between about 1 and about 2 p.p.m. by weight. Again, any reduction from that oxygen content contained in the unpurged catalyst can be expected to result in conversion improvement.

It is to be understood that the method of this invention can be practiced by passing the feedstream in contact with the catalyst under conditions in which both the feedstream and the catalyst are substantially free of oxygen.

It will be evident from the foregoing that various modifications can be made to the method of this invention. Such are considered, however, to be within the scope of the invention.

What is claimed is:
1. In the process wherein a hydrocarbon feedstream comprising paraffin hydrocarbons is contacted with hydrogen and with an alumina catalyst containing platinum and chlorine under isomerization conditions and wherein said feedstream contains molecular or gaseous oxygen as an impurity therein, the improvement comprising increasing catalyst life and activity by providing to said process a hydrocarbon feedstream substantially free of molecular or gaseous oxygen by the steps of:
(a) fractionating said hydrocarbon feedstream to substantially remove molecular and gaseous oxygen from said feedstream;
(b) maintaining the fractionated feedstream in a substantially oxygen-free environment after fractionation and prior to contact with said catalyst to prevent substantial oxygen reabsorption by said fractionated feedstream;

(c) passing an inert gas into contact with said catalyst prior to contacting said catalyst with said feedstream to remove the molecular oxygen from said catalyst; and, (d) maintaining said catalyst in a substantially oxygen-free environment after contact with said inert gas until said catalyst is contacted with said substantially oxygen-free hydrocarbon feedstream and said hydrogen.

References Cited

UNITED STATES PATENTS

| 3,131,235 | 4/1964 | Asselin | 260—683.68 |
| 3,506,733 | 4/1970 | Mayhue | 260—683.68 |
| 3,424,697 | 1/1969 | Notari et al. | 260—683.68 |
| 3,652,709 | 3/1972 | Durkin et al. | 260—683.68 |
| 3,472,912 | 10/1969 | Quisenberry | 260—683.65 |

PAUL M. COUGHLAN, Jr., Primary Examiner

G. J. CRASANAKIS, Assistant Examiner